United States Patent
Awagakubo et al.

(10) Patent No.: US 11,174,193 B2
(45) Date of Patent: *Nov. 16, 2021

(54) CONDUCTIVE COMPOSITION AND METHOD FOR PRODUCING TERMINAL ELECTRODE

(71) Applicant: SUMITOMO METAL MINING CO., LTD., Tokyo (JP)

(72) Inventors: Shingo Awagakubo, Ome (JP); Katsuhiro Kawakubo, Ome (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 51 days.

This patent is subject to a terminal disclaimer.

(21) Appl. No.: 16/608,039

(22) PCT Filed: Apr. 20, 2018

(86) PCT No.: PCT/JP2018/016336
§ 371 (c)(1),
(2) Date: Dec. 20, 2019

(87) PCT Pub. No.: WO2018/198985
PCT Pub. Date: Nov. 1, 2018

(65) Prior Publication Data
US 2020/0115275 A1  Apr. 16, 2020

(30) Foreign Application Priority Data

Apr. 28, 2017 (JP) .............................. JP2017-089293

(51) Int. Cl.
*H01B 1/16* (2006.01)
*C09D 5/24* (2006.01)
*C23C 8/00* (2006.01)
*C03C 8/18* (2006.01)
*C03B 32/00* (2006.01)
*C03C 4/14* (2006.01)
(Continued)

(52) U.S. Cl.
CPC ................ *C03C 8/18* (2013.01); *C03B 32/00* (2013.01); *C03C 4/14* (2013.01); *C03C 8/04* (2013.01);
(Continued)

(58) Field of Classification Search
CPC ... H01B 1/00; H01B 1/16; H01B 1/22; C09D 5/24; B05D 5/12; C03C 4/14; C03C 8/18
See application file for complete search history.

(56) References Cited

U.S. PATENT DOCUMENTS 5,035,837 A      7/1991  Saeki et al.
2012/0154977 A1  6/2012  Hur et al.
(Continued)

FOREIGN PATENT DOCUMENTS

CN    102543251 A    7/2012
JP    H03-141502 A   6/1991
(Continued)

OTHER PUBLICATIONS

International Search Report dated May 22, 2018, issued in counterpart Application No. PCT/JP2018/016336, with English translation. (5 pages).

(Continued)

*Primary Examiner* — Mark Kopec
(74) *Attorney, Agent, or Firm* — Westerman, Hattori, Daniels & Adrian, LLP

(57) ABSTRACT

A conductive composition has excellent adhesiveness and conductivity. A conductive composition contains copper powder, cuprous oxide, a lead-free glass frit, and an acid-based additive. The lead-free glass frit is contained in an amount of 9 to 50 parts by mass relative to 100 parts of the copper powder. The lead-free glass frit contains a borosilicate zinc-based glass frit and a vanadium zinc-based glass frit. The borosilicate zinc-based glass frit contains boron (Continued)

oxide, silicon oxide, zinc oxide, and optional other components, among which boron oxide, silicon oxide, and zinc oxide serve as top-three oxide components in terms of content. The vanadium zinc-based glass frit contains vanadium oxide, zinc oxide, and optional other components, among which vanadium oxide and zinc oxide serve as top-two oxide components in terms of content. The acid-based additive is contained 0.1 to 5.0 parts by mass relative to 100 parts of the copper powder.

12 Claims, 2 Drawing Sheets

(51) Int. Cl.
  *C03C 8/04* (2006.01)
  *H01G 4/248* (2006.01)
  *H01G 4/30* (2006.01)
(52) U.S. Cl.
  CPC ............... *C09D 5/24* (2013.01); *H01B 1/16* (2013.01); *H01G 4/248* (2013.01); *H01G 4/30* (2013.01)

(56) References Cited

U.S. PATENT DOCUMENTS

| | | | | |
|---|---|---|---|---|
| 2013/0118573 A1* | 5/2013 | Adachi | ............. | H01L 31/02245 |
| | | | | 136/256 |
| 2013/0344342 A1* | 12/2013 | Ogata | ...................... | H01B 1/22 |
| | | | | 428/426 |
| 2014/0363681 A1* | 12/2014 | Garcia | ................... | H05K 1/092 |
| | | | | 428/426 |
| 2016/0013331 A1 | 1/2016 | Park et al. | | |
| 2016/0326044 A1* | 11/2016 | Dietz | ........................ | C03C 8/24 |
| 2017/0222069 A1 | 8/2017 | Park et al. | | |

FOREIGN PATENT DOCUMENTS

| | | | |
|---|---|---|---|
| JP | 2002-280248 | A | 9/2002 |
| JP | 2012-54113 | A | 3/2012 |
| JP | 2015-144126 | A | 8/2015 |
| JP | 2015-168587 | A | 9/2015 |
| JP | 2016-213284 | A | 12/2016 |
| JP | 2017-199543 | A | 11/2017 |
| JP | 2017-199544 | A | 11/2017 |
| TW | 201431819 | A | 8/2014 |
| TW | 201701299 | A | 1/2017 |

OTHER PUBLICATIONS

International Preliminary Report on Patentability (Form PCT/IB/373) issued in counterpart International Application No. PCT/JP2018/016336 dated Oct. 29, 2019, with Form PCT/ISA/237, with English translation. (11 pages).
Office Action dated Aug. 31, 2021, issued in counterpart TW application No. 107114317, with English translation. (11 pages).

* cited by examiner

CONDUCTIVE COMPOSITION AND METHOD FOR PRODUCING TERMINAL ELECTRODE

TECHNICAL FIELD

The present invention relates to a conductive composition and a method for producing a terminal electrode.

BACKGROUND ART

There is a method for forming terminal electrodes of electronic components and the like by firing a conductive composition containing a conductive component. In that case, for the conductive component, gold, silver, palladium, mixtures thereof, or the like is frequently being used. However, gold and palladium are noble metals and are thus expensive and vulnerable to price fluctuations owing to supply and demand conditions and the like. Consequently, use of these metals may lead to problems such as a cost increase in products and price fluctuations. Although silver is lower in price than gold and palladium, it has a problem in that it easily causes migration. Although nickel may be used apart from noble metals as the conductive component, it has a problem in that it has relatively low conductivity.

Given these circumstances, in recent years, copper, which has excellent conductivity, excellent migration resistance, and low price, has started to be used as the conductive component. A terminal electrode is formed by applying a paste-like conductive composition (conductive paste) the viscosity of which is adjusted by adding an organic vehicle to both end faces of an electronic component element body by printing such as screen printing and drying and then firing the conductive composition, for example. Copper is easily oxidized, and firing of the conductive paste containing copper is generally performed in a reductive atmosphere or an inert gas atmosphere and is performed in a nitrogen gas, for example. When the conductive paste is fired in the atmosphere, copper is oxidized, and an oxide formed during the process may reduce conductivity.

The conductive composition containing copper often contains copper powder and a glass frit as main components. The glass frit has the effect of causing the conductive component to adhere together or causing a substrate and the conductive component to adhere to each other. For the glass frit, glass frits containing lead have been conventionally frequently used. The glass frits containing lead have low softening temperature and have excellent wettability with the conductive component and the substrate, and a conductive composition containing a lead glass frit has sufficient conductivity and adhesiveness to the substrate.

However, in recent years, restrictions on chemicals harmful to the environment have become strict, and lead is a substance to be restricted in the RoHS instructions and the like. Given these circumstances, a conductive composition containing a glass frit containing no lead (a lead-free glass frit) is being demanded.

Patent Literature 1 describes a copper paste composition containing inorganic components with copper powder, cuprous oxide powder, cupric oxide powder, and glass powder as main components and an organic vehicle component and states that this copper paste composition is suitable for low-temperature firing at 550 to 750° C. in particular, for example. However, in its examples, only glass powder containing lead is disclosed as the glass powder contained in this copper paste composition.

It is known that the lead-free glass frit, which does not substantially contain any lead, is inferior to the lead glass frit in wettability with a substrate. Owing to this, a conductive composition containing the lead-free glass frit cannot necessarily sufficiently obtain adhesiveness between a conductor and the substrate. The tendency becomes conspicuous as a heat treatment temperature during firing is lowered in particular. Given these circumstances, a conductive composition containing the lead-free glass frit that can form a conductor having sufficient conductivity and adhesiveness is being demanded.

Patent Literature 2 discloses copper paste containing copper powder, a lead-free glass frit, and cuprous oxide, the lead-free glass frit containing oxides of bismuth, boron, and silicon and having a softening starting temperature of 400° C. or less, for example. It is stated that this copper paste has excellent adhesiveness to a ceramic substrate.

Patent Literature 3 discloses copper paste that has excellent electric characteristics and adhesive strength by adding lead-free glass frits such as a borosilicate-based glass frit ($SiO_2$—$B_2O_3$-based) and a borosilicate barium-based glass frit (BaO—$SiO_2$—$B_2O_3$-based) and a borosilicate zinc-based glass frit containing zinc oxide in a specific ratio as glass frits to be contained in copper paste for an external electrode.

CITATION LIST

Patent Literature

[Patent Literature 1] Japanese Unexamined Patent Application Publication No. H03-141502
[Patent Literature 2] Japanese Unexamined Patent Application Publication No. 2012-54113
[Patent Literature 3] Japanese Unexamined Patent Application Publication No. 2002-280248

SUMMARY OF INVENTION

Technical Problem

However, the copper paste described in Patent Literature 2 and the copper paste described in Patent Literature 3 form a conductor by firing at 900° C., and no study is conducted about whether a conductor having sufficient conductivity and adhesiveness can be obtained even when the copper pastes are fired at a low temperature of 750° C. or less, for example.

The present invention has been studied in view of such circumstances, and an object thereof is to provide a conductive composition that can be fired even at a temperature of about 750° C., has sufficient adhesiveness, and has excellent conductivity in particular.

Solution to Problem

A first aspect of the present invention provides a conductive composition containing copper powder, cuprous oxide, a lead-free glass frit, and a carboxylic acid-based additive, the lead-free glass frit being contained in an amount of at least 9 parts by mass and up to 50 parts by mass relative to 100 parts by mass of the copper powder, the lead-free glass frit containing a borosilicate zinc-based glass frit and a vanadium zinc-based glass frit, the borosilicate zinc-based glass frit containing boron oxide, silicon oxide, zinc oxide, and optional other components, among which boron oxide, silicon oxide, and zinc oxide serve as top-three oxide components in terms of content, the vanadium zinc-based glass frit containing vanadium oxide, zinc oxide, and optional other components, among which vanadium oxide and zinc oxide serve as top-two oxide components in terms of content, and the carboxylic acid-based additive being contained in an amount of at least 0.1 part by mass and up to 5.0 parts by mass relative to 100 parts by mass of the copper powder.

The vanadium zinc-based glass frit is preferably contained in an amount of at least 10% by mass and up to 90% by mass relative to 100% by mass of the lead-free glass frit. The vanadium zinc-based glass frit preferably contains vanadium oxide in an amount of at least 30% by mass and up to 50% by mass and preferably contains zinc oxide in an amount of at least 30% by mass and up to 50% by mass. The borosilicate zinc-based glass frit is preferably contained in an amount of at least 10% by mass and up to 90% by mass relative to 100% by mass of the lead-free glass frit. The borosilicate zinc-based glass frit preferably contains silicon oxide in an amount of at least 35% by mass and up to 55% by mass and preferably contains boron oxide in an amount of at least 5% by mass and up to 20% by mass. The carboxylic acid-based additive is preferably at least one selected from oleic acid and linoleic acid. Cuprous oxide is preferably contained in an amount of at least 5.5 parts by mass and up to 50 parts by mass relative to 100 parts by mass of the copper powder. The copper powder preferably contains at least either spherical powder or flake-shaped powder. The copper powder preferably has an average particle diameter of at least 0.2 μm and up to 5 μm. The conductive composition preferably contains an organic vehicle in an amount of at least 10% by mass and up to 50% by mass relative to 100% by mass of the conductive composition.

A second aspect of the present invention provides a method for producing a terminal electrode including a process of forming nickel plating or tin plating on a surface of a conductor obtained by firing the conductive composition.

The method for producing a terminal electrode preferably includes a process of forming nickel plating or tin plating on a surface of a conductor obtained by firing the conductive composition.

The present invention can provide a conductive composition that can form a conductor that can be fired even at a temperature of 750° C. or less, has excellent adhesiveness, and has excellent conductivity in particular. Consequently, using the conductive composition of the present invention, a terminal electrode that has excellent adhesiveness and conductivity without damaging resistors, internal elements, and the like of an electronic component can be provided.

DESCRIPTION OF EMBODIMENTS

1. Conductive Composition

Figure 1A:
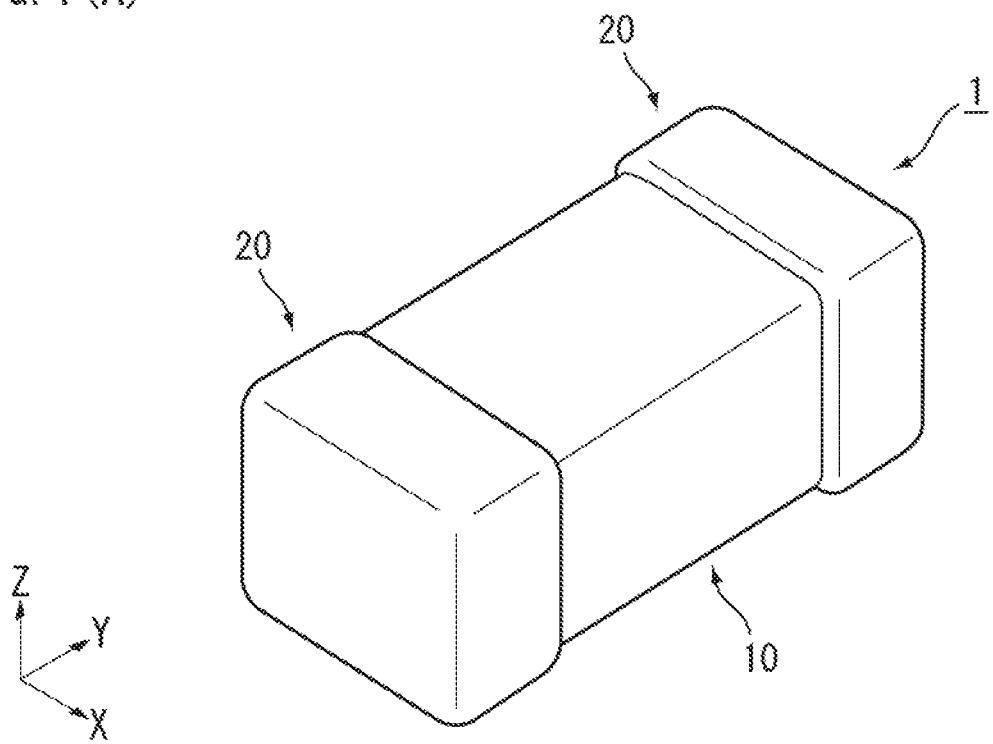
FIGS. 1 (A) and 1 (B) are a diagram of a multilayer ceramic capacitor.

A conductive composition of the present embodiment contains copper powder, a lead-free glass frit, cuprous oxide, and a carboxylic acid-based additive. The conductive composition does not contain any lead glass frit and thus does not substantially contain any lead and has excellent environmental characteristics. The lead-free glass frit refers to a glass frit that does not contain any lead or that, even when it contains lead, is extremely small in its content (e.g., the content of lead is 0.1% by mass or less relative to the entire glass frit). That the conductive composition does not substantially contain any lead refers to a state in which the content of lead is 0.01% by mass or less relative to the entire conductive composition, for example.

The following describes components forming the conductive composition.

(1) Copper Powder

The conductive composition of the present embodiment contains the copper powder as a conductive component. The copper powder has excellent conductivity and migration resistance and low price. The copper powder is easily oxidized, and when the conductive composition is subjected to heat treatment, it is normally subjected to heat treatment in a nitrogen atmosphere.

As to a method for producing the copper powder, which is not limited to a particular method, conventionally known methods such as atomization, wet reduction, and electrolysis can be used. When atomization is used, for example, the remaining concentration of impurities in copper powder to be obtained can be reduced, and the number of pores reaching the inside of the particles of the copper powder to be obtained from the surface thereof can be reduced, by which the copper powder can be inhibited from being oxidized.

The shape and particle diameter of the copper powder, which are not limited to particular ones, can be selected as appropriate in accordance with a target electronic component. As to the shape of the copper powder, a spherical or flake-shaped copper powder or a mixture of these can be used, for example. The copper powder contains the flake-shaped copper powder to increase the contact area of the copper powder and may have excellent conductivity, for example.

When the mixture of the spherical powder and flake-shaped copper powder is used, the copper powder can select the mixing ratios of the spherical powder and flake-shaped copper powder as appropriate depending on its use. As to the mixing ratios, relative to 100 parts by mass of the entire copper powder, the spherical copper powder can be contained in an amount of at least 10 parts by mass and up to 90 parts by mass, whereas the flake-shaped copper powder can be contained in an amount of up to 90 parts by mass and at least 10 parts by mass, for example.

The copper powder can have an average particle diameter of at least 0.2 μm and up to 5 μm for the spherical copper powder, for example. For the flake-shaped copper powder, the particle diameter flattened in a flake shape can be about at least 3 μm and up to 30 μm, for example. When the particle diameter is within the above range, applicability to an electronic component reduced in size is excellent. For the spherical copper powder, this average particle diameter is a median diameter (D50) of accumulated distribution and can be measured with a particle size distribution measuring apparatus based on a laser diffraction/scattering method. For the copper powder, powder having the same particle diameter may be used, or two or more types of powder having different particle diameters may be used in a mixed manner. For the flake-shaped copper powder, the particle diameter can be measured by electron microscopic observation.

Normally, reducing the particle diameter of the conductive powder can facilitate firing; when the average particle diameter of the spherical copper powder is less than 0.2 μm, for example, the copper powder is easily oxidized, and not only a sintering failure occurs on the contrary but also problems such as a shortage of capacity and a change in paste viscosity with the lapse of time may be likely to occur. The conductive composition of the present embodiment can sufficiently fire the copper powder even by low-temperature heat treatment at 750° C. or less, for example, by containing specific components described below even when the particle diameter of the copper powder is 1 µm or more, for example.

(2) Lead-Free Glass Frit

The conductive composition of the present embodiment contains a borosilicate zinc-based glass frit and a vanadium zinc-based glass frit as the lead-free glass frit. The conductive composition has excellent wettability to the copper powder and the substrate with a good balance even when the lead-free glass frit is contained by containing the glass frit with the above two kinds combined, and this conductive composition can obtain a conductor that has particularly excellent conductivity and adhesiveness even when it is fired at a temperature of 750° C. or less.

The conductive composition preferably contains the lead-free glass frit in an amount of at least 9 parts by mass and up to 50 parts by mass, more preferably contains it in an amount of at least 16 parts by mass and up to 45 parts by mass, and even more preferably contains it in an amount of at least 20 parts by mass and up to 41 parts by mass relative 100 parts by mass of the copper powder. When the content of the lead-free glass frit is within the above range, a suitable terminal electrode can be formed. When the conductive composition with the content of the lead-free glass frit being within the above range is used for the formation of a terminal electrode, adhesiveness further improves, and excellent resistance to corrosion, deformation, or the like occurring when the surface of the terminal electrode is nickel plated or tin plated can be gained. When the content of the lead-free glass frit is within the above range, conductivity also tends to improve in accordance with an increase in the content of the lead-free glass frit in the conductive composition.

The lead-free glass frit is contained in an amount of at least 5% by mass and up to 40% by mass, for example, and is preferably contained in an amount of at least 10% by mass and up to 30% by mass relative to 100% by mass of conductive paste.

The borosilicate zinc-based glass frit refers to a glass frit containing boron oxide ($B_2O_3O$), silicon oxide ($SiO_2$), zinc oxide (ZnO), and optional other components, among which $B_2O_3$, $SiO_2$, and ZnO serve as top-three oxide components in terms of content. The borosilicate zinc-based glass frit preferably contains $SiO_2$ in an amount of at least 35% by mass and up to 55% by mass, ZnO in an amount of at least 10% by nass and up to 30% by mass, and $B_2O_3$ in an amount of at least 5% by mass and up to 20% by mass. When the oxide components are contained in the above respective ranges, a conductor to be formed has particularly excellent acid resistance and corrosion resistance and can resist plating treatment of nickel plating or tin plating, and the conductive composition can thus suitably be used as conductive paste forming a terminal electrode.

The composition of the borosilicate zinc-based glass frit can optionally contain components other than those described above and can contain oxides of alkali metals such as $Li_2O$ and $K_2O$; and $Al_2O_3$, CaO, $ZrO_2$, and CuO, for example. The amounts to be added of these other components are each preferably at least 0.5% by mass and up to 10% by mass, for example.

The borosilicate zinc-based glass frit has a softening point of preferably 600° C. or less, more preferably at least 400° C. and up to 600° C., and even more preferably at least 500° C. and up to 600° C. When the softening point is within the above range, a conductor that has excellent conductivity and adhesiveness can be obtained even when low-temperature firing is performed. The softening point can be controlled by adjusting the composition of the glass frit as appropriate, for example. The softening point can be measured by thermogravimetric differential thermal analysis (TG-DTA) in the atmosphere with a temperature rising rate of 10° C./min.

The particle diameter of the borosilicate zinc-based glass frit, which is not limited to a particular value, is an average particle diameter of at least 1 µm and up to 10 µm, for example, and preferably at least 1 µm and up to 5 µm. The softening point of the borosilicate zinc-based glass frit is within the above range, and the particle diameter thereof is within the above range, whereby fused borosilicate zinc-based glass has excellent fluidity even in firing at a temperature of 750° C. or less, and a conductor that has particularly excellent adhesiveness can be obtained. The average particle diameter is a median diameter (D50) of accumulated distribution and can be measured with a particle size distribution measuring apparatus based on a laser diffraction/scattering method. As a laser diffraction/scattering particle diameter/particle size distribution measuring apparatus, a measuring apparatus called Microtrac (registered trademark) is known.

The borosilicate zinc-based glass frit is contained in an amount of at least 10% by mass and up to 90% by mass, for example, is preferably contained in an amount of at least 20% by mass and up to 80% by mass, and is more preferably contained in an amount of at least 50% by mass and up to 70% by mass relative to 100% by mass of the lead-free glass frit. In the present embodiment, when the content of the borosilicate zinc-based glass frit is within the above range, the conductor to be formed has excellent conductivity and adhesiveness to the substrate with a good balance.

The vanadium zinc-based glass frit contains zinc oxide (ZnO) and vanadium oxide ($V_2O_5$), among which vanadium oxide and zinc oxide serve as top-two oxide components in terms of content. The vanadium zinc-based glass frit preferably contains ZnO in an amount of at least 30% by mass and up to 50% by mass and $V_2O_5$ in an amount of at least 30% by mass and up to 50% by mass. The vanadium zinc-based glass frit contains a vanadium oxide, whereby a conductive composition that has excellent fluidity can be obtained even by heat treatment at a low temperature.

The composition of the vanadium zinc-based glass frit may contain optional components other than those described above and may contain oxides of alkali metals such as CaO; and $B_2O_3$, $Bi_2O_3$, and $Al_2O_3$, for example. The amounts to be added of these optional components are each preferably at least 0.5% by mass and up to 10% by mass, for example.

The vanadium zinc-based glass frit has a softening point of preferably 600° C. or less, more preferably at least 300° C. and up to 500° C., and even more preferably at least 350° C. and up to 450° C. When the softening point is within the above range, a conductive composition that has excellent fluidity can be obtained. The softening point can be controlled by adjusting the composition of the glass frit as appropriate, for example. The softening point can be measured by thermogravimetric differential thermal analysis (TG-DTA) in the atmosphere with a temperature rising rate of 10° C./min.

The particle diameter of the vanadium zinc-based glass frit, which is not limited to a particular value, is an average particle diameter of at least 1 µm and up to 10 µm, for example, and preferably at least 1 µm and up to 5 µm. When the softening point of the vanadium zinc-based glass frit is within the above range, and when the particle diameter thereof is within the above range, fused vanadium zinc-based glass has excellent fluidity even in firing at a temperature of 750° C. or less, and a conductor that has particularly excellent adhesiveness can be obtained. This average particle diameter is a median diameter (D50) of accumulated distribution and can be measured with a particle size distribution measuring apparatus based on a laser diffraction/scattering method.

The vanadium zinc-based glass frit is contained in an amount of at least 10% by mass and up to 90% by mass, for example, is preferably contained in an amount of at least 20% by mass and up to 80% by mass, and is more preferably contained in an amount of at least 30% by mass and up to 50% by mass relative to 100% by mass of the lead-free glass frit. In the present embodiment, when the content of the vanadium zinc-based glass frit is within the above range, the conductor to be formed has excellent conductivity and adhesiveness to the substrate with a good balance.

The softening point of the borosilicate zinc-based glass frit can be higher than the softening point of the vanadium zinc-based glass frit. The conductive composition has excellent fluidity of the glass fused from a temperature rising process when the conductive composition is fired and has excellent wettability to the conductive component and the substrate with a good balance by containing the glass frits having different softening points, and a conductor that has particularly excellent adhesiveness can be obtained. ZnO contained in these glass frits is reduced to zinc by residual char (soot and carbon) originating from the organic vehicle during a drying or firing process, and this zinc can inhibit the oxidation of the copper powder. The function of ZnO in the glass frits is not limited to the above.

In the conductive composition, ZnO is contained in an amount of at least 1 part by mass and up to 15 parts by mass, for example, and is preferably contained in an amount of at least 3 parts by mass and up to 12 parts by mass relative to 100 parts by mass of the copper powder. $SiO_2$ is contained in an amount of at least 1 part by mass and up to 15 parts by mass, for example, and is preferably contained in an amount of at least 4 parts by mass and up to 12 parts by mass relative to 100 parts by mass of the copper powder. $B_2O_3$ is contained in an amount of at least 1 part by mass and up to 10 parts by mass, for example, and is preferably contained in an amount of at least 2 parts by mass and up to 6 parts by mass relative to 100 parts by mass of the copper powder.

In the conductive composition, $V_2O_5$ is contained in an amount of at least 1 part by mass and up to 10 parts by mass, for example, and is preferably contained in an amount of at least 2 parts by mass and up to 7 parts by mass relative to 100 parts by mass of the copper powder. When the content of $V_2O_5$ is within the above range, more excellent fluidity and adhesiveness are gained. In the conductive composition, CuO may be contained in an amount of at least 1 part by mass and up to 3 parts by mass, for example, relative to 100 parts by mass of the copper powder.

(3) Cuprous Oxide

The conductive composition of the present embodiment contains cuprous oxide (copper(I) oxide: $Cu_2O$). With this composition, the sintering of the copper powder of copper conductive paste for low-temperature firing can be facilitated.

The content of cuprous oxide can be preferably at least 5.5 parts by mass and up to 50 parts by mass, for example, is more preferably at least 7 parts by mass and up to 40 parts by mass, and is even more preferably at least 7 parts by mass and up to 15 parts by mass relative to 100 parts by mass of the copper powder. When the content of copper oxide is within the above range, the sintering of the copper powder is facilitated, and more excellent conductivity and adhesiveness are gained. When the content of cuprous oxide exceeds 50 parts by mass relative to 100 parts by mass of the copper powder, excessive copper oxide that does not contribute to the sintering of copper serves as resistance even when the carboxylic acid-based additive described below is contained, which may cause insufficient conductivity.

The lead-free glass frit tends to have insufficient adhesiveness to the substrate when it is fired in a nonoxidative atmosphere (e.g., in a nitrogen gas atmosphere). However, when the conductive composition containing the lead-free glass frit and cuprous oxide is prepared to be paste-like, for example, and is then subjected to heat treatment in a nonoxidative atmosphere, a minute amount of oxygen is introduced from cuprous oxide into a firing atmosphere during the heat treatment, whereby adhesiveness to the substrate can be improved. Upon release of oxygen to the nonoxidative atmosphere, cuprous oxide becomes copper and forms a conductor obtained by firing the conductive composition together with the copper powder. The conductive composition of the present embodiment can markedly improve conductivity and adhesiveness to the substrate by combining the borosilicate zinc-base glass frit, the vanadium zinc-based glass frit, cuprous oxide with each other. The conductive composition of the present embodiment may contain a small amount of cupric oxide (copper(II) oxide: CuO) to the extent that the effects described above are not impaired. Cupric oxide can be contained in an amount of at least 0 part by mass and up to 5 parts by mass relative to 100 parts by mass of the copper powder, for example.

Cuprous oxide is preferably powdery, and its average particle diameter is preferably 5 µm or less. By using cuprous oxide powder with an average particle diameter of 5 µm or less, cuprous oxide can be dispersed and blended in the conductive composition. The lower limit of the average particle diameter of cuprous oxide, which is not limited to a particular value, can be 0.1 µm or more, for example. The average particle diameter of cuprous oxide can be measured by electron microscopic observation or with a particle size distribution measuring apparatus based on a laser diffraction/scattering method.

(4) Carboxylic Acid-Based Additive

The conductive composition of the present embodiment can improve the effect of facilitating the sintering of the copper powder by cuprous oxide and can form a conductor that has more excellent adhesiveness, conductivity, and the like by containing the carboxylic acid-based additive.

Although cuprous oxide has the effect of facilitating the sintering of the copper powder as described above, and the sintering of the copper powder improves conductivity, not all cuprous oxide can facilitate sintering, and part thereof may be present unreacted.

It is considered that the conductive composition of the present embodiment can cause this unreacted cuprous oxide to further react by containing the carboxylic acid-based additive. It is considered that the sinterability of the copper powder improves through the reaction of cuprous oxide and the amount of cuprous oxide remaining in the conductor as an electric resistant component reduces, whereby conductivity can further be improved.

The content of the carboxylic acid-based additive can be preferably at least 0.1 part by mass and up to 5.0 parts by mass, for example, is more preferably at least 1.0 part by mass and up to 4.0 parts by mass, and is even more preferably at least 2.0 parts by mass and up to 3.0 parts by mass relative to 100 parts by mass of the copper powder. When the content of the carboxylic acid-based additive is within the above range, an effect of improving the effect of facilitating the sintering of the copper powder by cuprous oxide and facilitating the decomposition of cuprous oxide is produced. When the content of the carboxylic acid-based additive exceeds 5.0 parts by mass relative to 100 parts by mass of the copper powder, when the organic vehicle is added to the conductive composition to make a paste-like composition, problems in that the adhesiveness of a conductor obtained from the paste-like composition reduces and the copper powder dissolves by long-term storage to change the color of the paste-like composition may occur.

The carboxylic acid-based additive refers to an additive having a carboxy group and is preferably an unsaturated fatty acid that is liquid at room temperature. Examples of the carboxylic acid-based additive include myristoleic acid, palmitoleic acid, oleic acid, and linoleic acid; among these, more preferred is at least one selected from oleic acid and linoleic acid.

The carboxylic acid-based additive also has a function as a dispersant for, when the organic vehicle is added to the conductive composition according to the present embodiment to make a paste-like composition, dispersing the copper powder and the lead-free glass frit into the organic vehicle. In view of improvement in dispersability into the organic vehicle, the carboxylic acid-based additive is preferably an unsaturated carboxylic acid with a carbon number of at least 14 and up to 18.

(5) Organic Vehicle

The conductive composition of the present embodiment may contain an organic vehicle. The organic vehicle adjusts the viscosity of the conductive composition and can make a paste-like composition having appropriate printability.

For the organic vehicle, the composition thereof is not limited to a particular composition, known ones used for conductive paste can be used. The organic vehicle contains a resin component and a solvent, for example. Examples of the resin component include a cellulose resin and an acrylic resin. Examples of the solvent include terpene-based solvents such as terpineol and dihydro terpineol and ether-based solvents such as ethylcarbitol and butylcarbitol, which are used singly or in a mixed manner.

The organic vehicle is a component that volatilizes or combusts when the conductive composition is dried or fired, and the content of the organic vehicle in the conductive composition is not limited to a particular content. The organic vehicle maybe added so as to cause the conductive composition to have appropriate viscosity and applicability, and its content can be adjusted as appropriate depending on its use or the like. The organic vehicle can be contained in an amount of at least 10% by mass and up to 50% by mass relative to 100% by mass of the paste-like conductive composition (the conductive paste), for example.

The conductive composition of the present embodiment may contain other components to the extent that the effects of the present invention are produced. An antifoaming agent, a dispersant, a coupling agent, or the like may be added to the conductive composition as appropriate as such other components, for example.

(6) Conductive Composition

The conductive composition of the present embodiment has particularly excellent conductivity and adhesiveness to the substrate of a conductor after firing and has excellent acid resistance and corrosion resistance and can thus be suitably used for the formation of the terminal electrode. The conductive composition of the present embodiment can be fired by heat treatment at 750° C. or less, can further be fired even by heat treatment at 600° C. or less, causes the formed conductor to show excellent conductivity and adhesiveness to the substrate, and can thus suitably be used as conductive paste for low-temperature firing.

The conductive composition of the present embodiment has a sheet resistance in terms of a film thickness of 10 μm of the conductor fired at 600° C. of preferably 30 mΩ or less and more preferably 20 mΩ or less. This sheet resistance is a value measured by a method described in examples described below.

The conductive composition of the present embodiment has a peel strength of the conductor fired at 600° C. of preferably 10 N or more and more preferably 20 N or more. This peel strength is a value measured when a Sn-plated Cu wire with a diameter of 0.6 mm is attached to a copper conductor produced by firing the conductive composition at 600° C. with a 3Ag-0.5Cu—Sn solder, and then the Sn-plated Cu wire is pulled to be destroyed, for example, and is a value evaluating adhesiveness between a substrate of an electronic component and the conductor.

The conductive composition of the present embodiment can also be used for other than the terminal electrode of the electronic component and may be used as internal electrodes and wires of electronic components and a material for bonding chip components such as electronic elements to lead frames and various kinds of substrates to establish electric or thermal conduction as an alternative to solder, for example.

2. Method for Producing Terminal Electrode

A method for producing a terminal electrode of the present embodiment includes a process of firing the conductive composition. The method for producing a terminal electrode can include a process of forming nickel plating or tin plating on the surface of a conductor obtained by firing the conductive composition. The following describes a method for producing an external electrode of a multilayer ceramic capacitor as an example of the method for producing a terminal electrode.

Figure 1B:
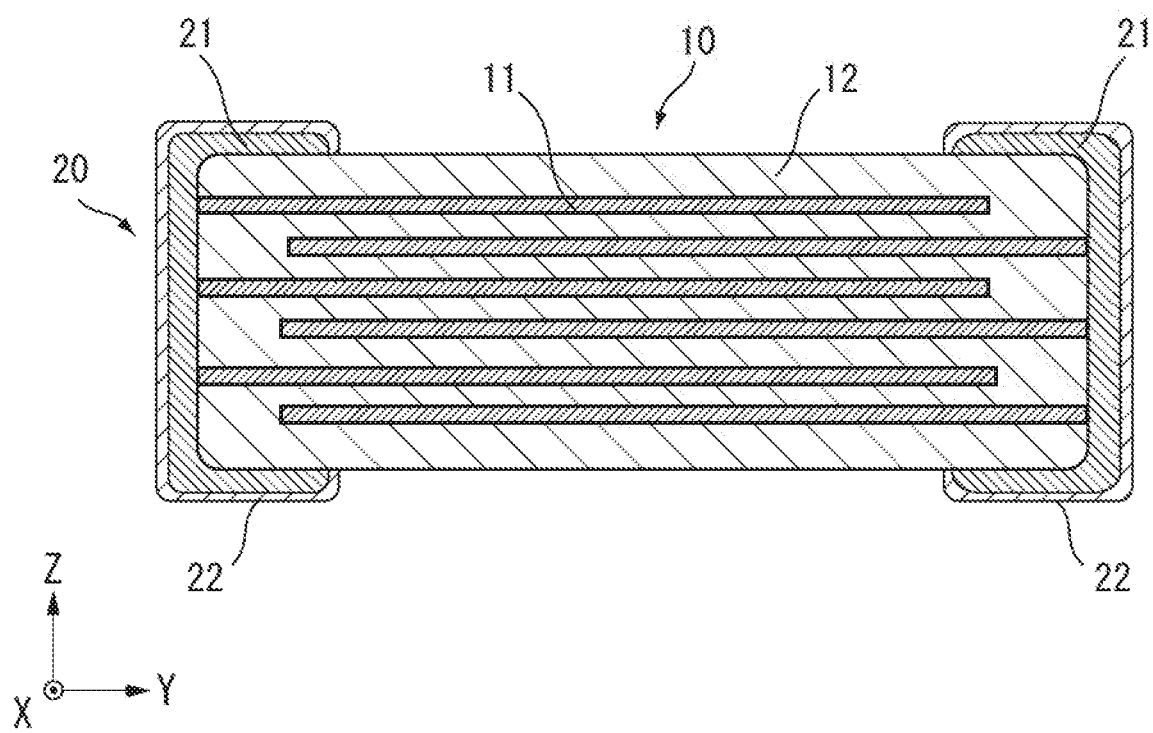

FIGS. 1(A) and 1(B) are diagrams of a multilayer ceramic capacitor 1 as an example of an electronic component according to an embodiment. The multilayer ceramic capacitor 1 includes a ceramic multilayer body 10 including a ceramic dielectric layer 12 such as barium titanate and an internal electrode layer 11 alternately layered and external electrodes 20.

The external electrodes 20 each include an external electrode layer 21 formed using the paste-like conductive composition (the conductive paste) and a plating layer 22. The external electrode layer 21 is electrically connected to the internal electrode layer 11. The external electrodes 20 each include may each include a layer other than the external electrode layer 21 and the plating layer 22. The external electrodes 20 do not necessarily include the plating layer 22.

The conductive paste is produced by mixing the copper powder, cuprous oxide, the lead-free glass frit, the carboxylic acid-based additive, and the organic vehicle together. The lead-free glass frit contains the borosilicate zinc-based glass frit and the vanadium zinc-based glass frit. The compositions and mixing ratios of the respective components in the conductive paste are as described above.

As to a method for producing the external electrode, the conductive paste is printed or applied onto end faces of the ceramic multilayer body 10 obtained by forming the internal electrode and firing by any method such as screen printing, transcription, or dip coating, for example. Next, drying and firing are performed to sinter Cu within the conductive paste to obtain the external electrode layer 21. Further, nickel plating and/or tin plating may be applied to the surface of the external electrode layer 21 to form the plating layer 22. When the external electrodes 20 have the plating layer 22, solderability improves. When the external electrodes of the multilayer ceramic capacitor are produced, the substrate for the conductive composition described above is the ceramic multilayer body.

Firing is in general performed by heat treatment at at least 800° C. and up to 1,000° C. The conductive paste of the present embodiment can sufficiently be fired even by heat treatment at less than 800° C., can be fired even by heat treatment at 750° C. or less, for example, and can be fired even by heat treatment at 650° C. or less. The conductive paste of the present embodiment can provide an external electrode that has particularly excellent conductivity and adhesiveness even when it is fired by heat treatment at 600° C. as shown in the examples described below. The lower limit of the heat treatment temperature of firing, which is not limited to a particular temperature, is 400° C. or more, for example. A firing treatment time is at least 5 minutes and up to 20 minutes at a peak, temperature, for example.

Drying may be performed before firing. Conditions of drying are not limited to particular ones; it can be performed at 50° C. to 150° C. for about 5 minutes to 15 hours, for example. An oxygen concentration in a burnout zone within a firing furnace, which is not limited to a particular concentration, can be 100 ppm, for example.

An electronic component of the present embodiment can be produced as an electronic component by applying the conductive paste onto an electronic component and firing the electronic component after application. When the conductive composition of the present embodiment is used in this method of producing an electronic component, the conductive paste can be fired by heat treatment at 750° C. or less, and thus damage to resistors, internal elements, and the like can be reduced. The heat treatment can also be performed at 650° C. or less and can further also be performed at 600° C. or less. A conductor formed by this method of production has particularly excellent conductivity and adhesiveness.

EXAMPLES

The following describes the present invention with reference to examples and comparative examples; these examples do not limit the present invention at all.

1. Raw Materials (1) Copper Powder (Spherical): Spherical copper powders with an average particle diameter of 0.3 µm and 1.0 µm produced by atomization were used.

(2) Lead-Free Glass Frits

Borosilicate zinc-based glass frit (A): A $ZnO$—$SiO_2$—$B_2O_3$-based glass frit (ZnO: 21% by mass, $SiO_2$: 47.6% by mass, $B_2O_3$: 10.6% by mass, softening point: 595° C., average particle diameter: 1.5 µm) vas used.

Borosilicate zinc-based glass frit (B): A $ZnO$—$SiO_2$—$B_2O_3$-based glass frit (ZnO: 15.5% by mass, $SiO_2$: 44.4% by mass, $B_2O_3$: 13.8% by mass, softening point: 590° C., average particle diameter: 1.5 µm) vas used.

Vanadium zinc-based glass frit: A $ZnO$—$V_2O_5$-based glass frit (ZnO: 40.9% by mass, $V_2O_5$: 39.5% by mass, softening point: 405° C., average particle diameter: 3.5 µm) was used.

Borosilicate bismuth-based glass frit: A $Bi_2O_3$—$SiO_2$—$B_2O_3$-based glass frit ($B_2O_3$: 24.4% by mass, $Bi_2O_3$: 34.1% by mass, $SiO_2$: 17% by mass, softening point: 580° C., average particle diameter: 1.5 µm) vas used.

Table 1 lists the compositions of the lead-free glass frits used.

The average particle diameters of the copper powder and the lead-free glass frits were measured with Microtrac. The softening points of the lead-free glass frits were measured by thermogravimetric differential thermal analysis (TG-DTA) in the atmosphere with a temperature rising rate of 10° C./min.

TABLE 1

| | $B_2O_3$ % by mass | $SiO_2$ % by mass | ZnO % by mass | $Al_2O_3$ % by mass | $Li_2O$ % by mass | $K_2O$ % by mass | CaO % by mass | $ZrO_2$ % by mass | — | Total % by mass |
|---|---|---|---|---|---|---|---|---|---|---|
| Borosilicate zinc-based glass frit A | 10.6 | 47.6 | 21 | 2.2 | 2.8 | 4.2 | 5.2 | 6.4 | — | 100 |

| | $B_2O_3$ % by mass | $SiO_2$ % by mass | ZnO % by mass | $Al_2O_3$ % by mass | $Li_2O$ % by mass | $K_2O$ % by mass | CaO % by mass | $ZrO_2$ % by mass | CuO % by mass | Total % by mass |
|---|---|---|---|---|---|---|---|---|---|---|
| Borosilicate zinc-based glass frit B | 13.8 | 44.4 | 15.5 | 1.9 | 2.6 | 3.8 | 4.8 | 6.1 | 7.1 | 100 |

| | $V_2O_5$ % by mass | ZnO % by mass | $B_2O_3$ % by mass | CaO % by mass | $Bi_2O_3$ % by mass | $Al_2O_3$ % by mass | — | — | — | Total % by mass |
|---|---|---|---|---|---|---|---|---|---|---|
| Vanadium zinc-based glass frit | 39.5 | 40.9 | 7 | 5.5 | 4.2 | 2.9 | — | — | — | 100 |

| | $B_2O_3$ % by mass | $SiO_2$ % by mass | ZnO % by mass | $Al_2O_3$ % by mass | $Bi_2O_3$ % by mass | $P_2O_5$ % by mass | CaO % by mass | CuO % by mass | — | Total % by mass |
|---|---|---|---|---|---|---|---|---|---|---|
| Borosilicate bismuth-based glass frit | 24.4 | 17 | 6.8 | 10 | 34.1 | 2.8 | 3 | 1.9 | — | 100 |

(3) For cuprous oxide, one with an average particle diameter of 3 μm was used.

(4) For the carboxylic acid-based additive, oleic acid and linoleic acid were used.

2. Production of Conductive Paste (Production of Organic Vehicle)

Relative to 80% by mass of terpineol, 18% by mass of ethyl cellulose and 2% by mass of an acrylic resin were mixed together, and the mixcure was heated up to 60° C. while stirring to produce a transparent, viscous organic vehicle.

(Production of Conductive Paste)

The copper powder, the glass frits, cuprous oxide, oleic acid or linoleic acid, and the organic vehicle prepared as described above were mixed together with a mixer to obtain a mixture. Table 2 lists the mixing ratios of the respective components. This mixture was kneaded with a three-roll mill to produce conductive paste.

3. Formation of Conductor for Evaluation (1) Sample for Evaluating Sheet Resistance Gold paste was printed onto an alumina substrate and was fired to prepare an alumina substrate formed with gold (Au) electrodes with an inter-electrode distance of 50 mm. On the surface of the substrate, using a pattern with a width of 0.5 mm and an inter-electrode distance of 50 mm, the obtained conductive paste was printed between the Au electrodes so as to give a thickness after firing of 10 μm to 13 μm. This alumina substrate after printing was subjected to heat treatment at 120° C. to dry the conductive paste. The alumina substrate after drying treatment was subjected to heat treatment with a nitrogen atmospheric belt furnace with a profile of a peak temperature of 600° C., a peak temperature duration of 10 minutes, and a time from a furnace entrance to a furnace exit of 60 minutes to fire the conductive paste. The oxygen concentration of a firing zone within the furnace was set to 5 ppm. Dry air was introduced to a burnout zone provided in the process of rising temperature up to 600° C. (from the furnace entrance to a 600° C. zone) to set an oxygen concentration to each concentration of 200 ppm, 400 ppm, and 600 ppm. The oxygen concentration was measured using a zirconia oxygen concentration meter (manufactured by Toray: Model LC-750) and was adjusted to each of the concentrations.

(2) Sample for Evaluating Adhesiveness

The conductive paste described above was printed onto an alumina substrate with a pattern of 2 mm×2 mm and was fired under the same conditions as the conditions of production of the sample for evaluating a sheet resistance described above to produce a sample for evaluating adhesiveness (with a thickness of 10 μm after firing).

(3) Characteristics Evaluation of Formed Conductor (3-1) Sheet Resistance (Conductivity)

A resistance measuring probe of a digital multimeter (manufactured by Advantest Corporation) was brought into contact with the Au electrodes of the sample for evaluating a sheet resistance obtained as above to measure a resistance R[t] of the conductor. Subsequently, this resistance R[t] was converted into a sheet resistance Rs[t] (=R(t)×W/L). Using this value, a sheet resistance RsO (=Rs[t]×t/10 (mΩ/)) when the thickness of the conductor was 10 μm was calculated, where t indicates the thickness of the conductor, W indicates the width of the conductor, and L indicates the length of the conductor. Table 2 lists these results.

(3-2) Adhesiveness to Substrate

A Sn-plated Cu wire with a diameter of 0.6 mm was soldered to the copper conductor of the obtained sample for evaluating adhesiveness using a solder with a composition of 96.5% by mass Sn-3% by mass Ag-0.5% by mass Cu and was pulled at a rate of 80 mm/min in the vertical direction using a load measuring instrument (manufactured by Aikoh Engineering Co., Ltd., MODEL 2152HTP). The peel strength when the conductor was peeled off from the substrate was measured at 20 points, and adhesiveness to the substrate was evaluated by its average.

TABLE 2

| | Conductive composition | | | | | | | |
|---|---|---|---|---|---|---|---|---|
| | Copper powder | | | Lead-free glass frit Parts by mass | Glass frits | | | |
| | Spherical powder 0.3 μm Parts by mass | Spherical powder 1.0 μm Parts by mass | Total Parts by mass | | Borosilicate zinc A % by mass | Borosilicate zinc B % by mass | Vanadium zinc % by mass | Borosilicate bismuth % by mass |
| Example 1 | 100 | 0 | 100 | 9.5 | 60 | 0 | 40.0 | 0 |
| Example 2 | 100 | 0 | 100 | 22.2 | 60 | 0 | 40.0 | 0 |
| Example 3 | 100 | 0 | 100 | 38.1 | 60 | 0 | 40.0 | 0 |
| Example 4 | 100 | 0 | 100 | 22.2 | 60 | 0 | 40.0 | 0 |
| Example 5 | 100 | 0 | 100 | 28.2 | 60 | 0 | 40.0 | 0 |
| Example 6 | 50 | 50 | 100 | 28.2 | 60 | 0 | 40.0 | 0 |
| Example 7 | 0 | 100 | 100 | 28.2 | 60 | 0 | 40.0 | 0 |
| Example 8 | 100 | 0 | 100 | 28.2 | 80 | 0 | 20.0 | 0 |
| Example 9 | 100 | 0 | 100 | 28.2 | 40 | 0 | 60.0 | 0 |
| Example 10 | 100 | 0 | 100 | 28.2 | 0 | 60.0 | 40.0 | 0 |
| Example 11 | 100 | 0 | 100 | 28.2 | 0 | 67.1 | 32.9 | 0 |
| Example 12 | 100 | 0 | 100 | 28.2 | 0 | 52.9 | 47.1 | 0 |
| Example 13 | 100 | 0 | 100 | 28.2 | 60 | 0 | 40.0 | 0 |
| Example 14 | 100 | 0 | 100 | 28.2 | 60 | 0 | 40.0 | 0 |
| Example 15 | 100 | 0 | 100 | 28.2 | 60 | 0 | 40.0 | 0 |

TABLE 2-continued

|  | | | | | | | | |
|---|---|---|---|---|---|---|---|---|
| Example 16 | 100 | 0 | 100 | 28.2 | 60 | 0 | 40.0 | 0 |
| Example 17 | 100 | 0 | 100 | 9.5 | 60 | 0 | 40.0 | 0 |
| Comparative Example 1 | 100 | 0 | 100 | 28.2 | 100 | 0 | 0 | 0 |
| Comparative Example 2 | 100 | 0 | 100 | 28.2 | 0 | 0 | 100 | 0 |
| Comparative Example 3 | 100 | 0 | 100 | 28.2 | 60 | 0 | 0 | 40 |
| Comparative Example 4 | 100 | 0 | 100 | 28.2 | 60 | 0 | 40.0 | 0 |
| Comparative Example 5 | 100 | 0 | 100 | 9.5 | 60 | 0 | 40.0 | 0 |
| Comparative Example 6 | 100 | 0 | 100 | 22.2 | 60 | 0 | 40.0 | 0 |

| | Conductive composition | | | Firing conditions | | Conductor | |
|---|---|---|---|---|---|---|---|
| | | Carboxylic acid-based additive | | | | | |
| | $Cu_2O$ | Oleic acid | Linoleic acid | Organic vehicle | | | |
| | Parts by mass | Parts by mass | Parts by mass | % by mass | Atmosphere | Peak temperature °C | Conductivity mΩ | Adhesiveness N |
| Example 1 | 7.6 | 2.5 | — | 26.0 | Nitrogen | 600 | 3.7 | 11.8 |
| Example 2 | 7.6 | 2.5 | — | 18.0 | Nitrogen | 600 | 4.5 | 21.3 |
| Example 3 | 7.5 | 2.5 | — | 16.0 | Nitrogen | 600 | 7.2 | 23.9 |
| Example 4 | 7.6 | 2.5 | — | 18.0 | Nitrogen | 600 | 4.6 | 17.7 |
| Example 5 | 37.1 | 2.5 | — | 18.0 | Nitrogen | 600 | 8.3 | 28.3 |
| Example 6 | 37.1 | 2.5 | — | 18.0 | Nitrogen | 600 | 12 | 25.4 |
| Example 7 | 37.1 | 2.5 | — | 18.0 | Nitrogen | 600 | 14.4 | 18.8 |
| Example 8 | 37.1 | 2.5 | — | 18.0 | Nitrogen | 600 | 9.4 | 22 |
| Example 9 | 37.1 | 2.5 | — | 18.0 | Nitrogen | 600 | 9.4 | 14.4 |
| Example 10 | 37.1 | 2.5 | — | 18.0 | Nitrogen | 600 | 9.5 | 29.3 |
| Example 11 | 37.1 | 2.5 | — | 18.0 | Nitrogen | 600 | 9.3 | 26.6 |
| Example 12 | 37.1 | 2.5 | — | 18.0 | Nitrogen | 600 | 9.8 | 25.4 |
| Example 13 | 37.1 | 0.1 | — | 18.0 | Nitrogen | 600 | 10.1 | 26.1 |
| Example 14 | 37.1 | 1.0 | — | 18.0 | Nitrogen | 600 | 9.3 | 28 |
| Example 15 | 37.1 | 4.0 | — | 18.0 | Nitrogen | 600 | 9.2 | 27.9 |
| Example 16 | 37.1 | 5.0 | — | 18.0 | Nitrogen | 600 | 10.3 | 26.3 |
| Example 17 | 7.6 | — | 2.5 | 26.0 | Nitrogen | 600 | 3.8 | 10.8 |
| Comparative Example 1 | 37.1 | 2.5 | — | 18 | Nitrogen | 600 | 11.8 | Electrode peeling |
| Comparative Example 2 | 37.1 | 2.5 | — | 18 | Nitrogen | 600 | 13.1 | Electrode peeling |
| Comparative Example 3 | 37.1 | 2.5 | — | 18 | Nitrogen | 600 | 15.8 | Electrode peeling |
| Comparative Example 4 | 37.1 | 5.5 | — | 18.0 | Nitrogen | 600 | 16.1 | 9.3 |
| Comparative Example 5 | 7.6 | — | — | 26.0 | Nitrogen | 600 | 4.9 | 10.1 |
| Comparative Example 6 | 7.6 | — | — | 18.0 | Nitrogen | 600 | 6.1 | 19.3 |

[Evaluation Results]

As listed in Table 2, the conductive compositions of the examples have sufficient adhesiveness to the substrate and can obtain a conductor having sufficient, conductivity.

In contrast, in Comparative Example 1, in which only the borosilicate zinc-based glass frit was contained as the glass frit, resulting in significantly poor adhesiveness, a stable conductor was not able to be formed. In Comparative Example 2, in which only the vanadium zinc-based glass frit was contained as the glass frit, the glass component penetrated the substrate too much, and the shape of the conductor was not able to be held, owing to which adhesiveness was not able to be evaluated. In Comparative Example 3, in which the borosilicate zinc-based glass frit and the borosilicate bismuth-based glass frit were contained as the glass frit, it was recognized that the glass did not sufficiently fuse to be poor in adhesiveness.

In Comparative Example 4, in which oleic acid as the carboxylic acid-based additive was excessively contained, it was recognized that the conductor had poor conductivity and adhesiveness. It is considered that this is because oleic acid being excessively present not only improved the sinterability of cuprous oxide but also caused dissolution or the like of the copper powder, which reduced conductivity and adhesiveness on the contrary. It was recognized that in the sample of Comparative Example 4 the produced conductive paste changed its color with the lapse of time because excessive oleic acid dissolved the copper powder.

Figure 2A:
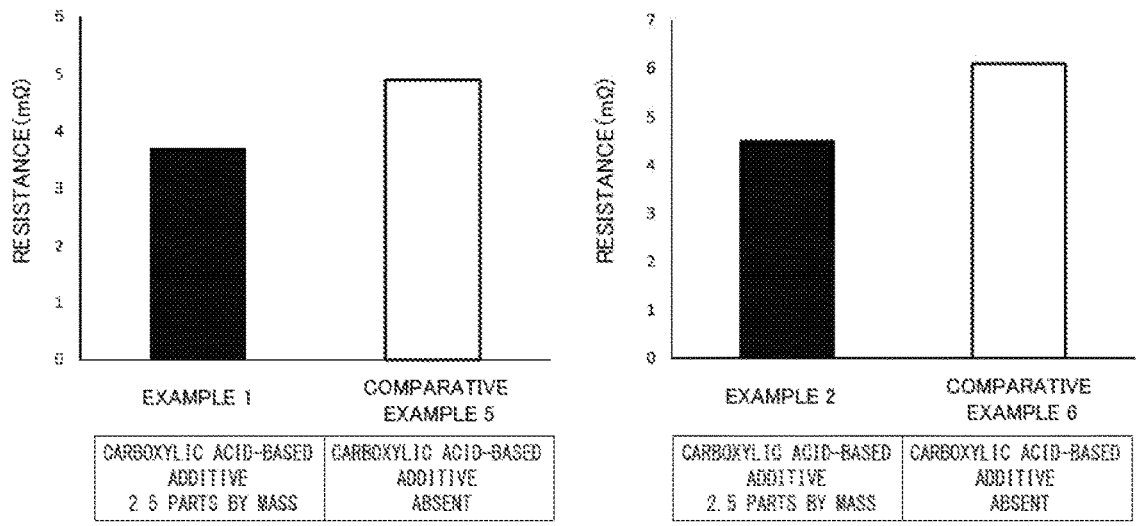
FIGS. 2 (A) and 2 (B) are graphs of evaluation results of Examples 1 and 2 and Comparative Examples 5 and 6.
Figure 2B:
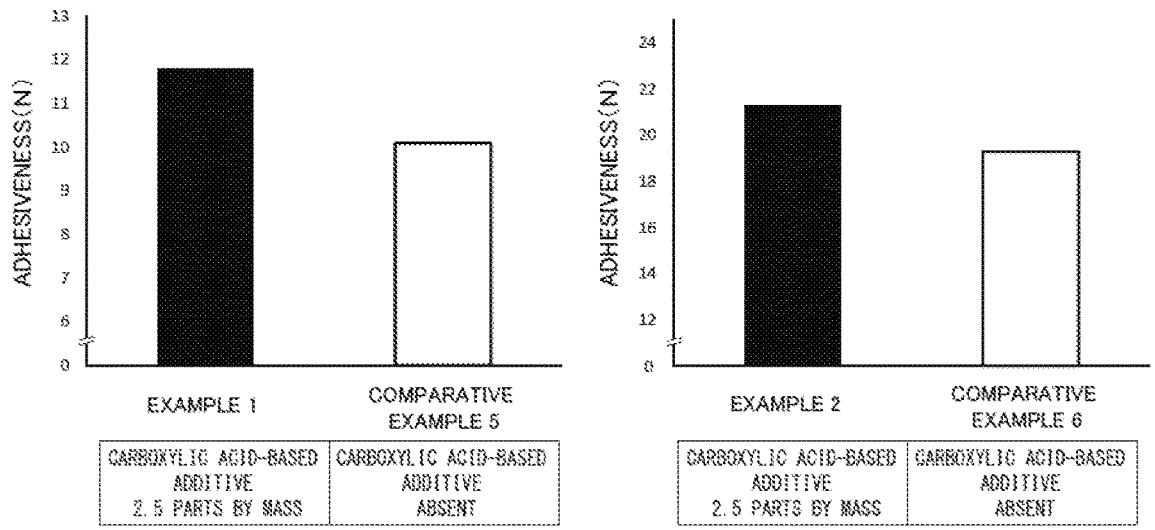

It was shown that the conductor of Comparative Example 5, which was obtained under the same conditions as those of Example 1 except that the carboxylic acid-based additive was not contained, reduced in conductivity and adhesiveness compared with the conductor of Example 1 (refer to FIG. 2). The conductor of Comparative Example 6, which was obtained under the same conditions as those of Example 2 except that the carboxylic acid-based additive was not contained, showed a similar tendency (refer to FIG. 2). These results show that containing the carboxylic acid-based additive further improves conductivity and adhesiveness.

From the foregoing results, it is clear that using the conductive composition of the present embodiment can form a conductor that has particularly excellent conductivity and adhesiveness when it is fired at a low temperature of 750° C. or less, or about 600° C., for example.

INDUSTRIAL APPLICABILITY

The conductive composition of the present embodiment has particularly excellent conductivity and adhesive strength and can suitably be used for the formation of conductors such as external electrodes by containing copper powder, specific lead-free glass frits, and cuprous oxide. The conductive composition of the present embodiment can also be used as internal electrodes of electronic components, an alternative to solder, and the like. Among them, the conductive composition of the present embodiment can suitably be used for terminal electrodes that can obtain adhesiveness to an element body, especially high adhesive strength even after plating treatment such as Ni plating or Sn plating is performed.

The technical scope of the present invention is not limited to the embodiment. One or more of the requirements described in the embodiment may be omitted, for example. The requirements described in the embodiment can be combined with each other as appropriate. To the extent that laws permit, the disclosure of Japanese Patent Application No. 2017-089293 as a Japanese patent application and all the pieces of literature cited in the embodiment and the like is incorporated herein by reference and is made part of this document.

DESCRIPTION OF REFERENCE SIGNS

1 Multilayer ceramic capacitor
10 Ceramic multilayer body
11 Internal electrode layer
12 Dielectric layer
20 External electrode
21 External electrode layer
22 Plating layer

The invention claimed is:

1. A conductive composition comps sing copper powder, cuprous oxide a lea free glass frit, and a carboxylic acid-based additive,
    the lead-free glass fit being contained in an amount of at least 9 parts mass and up to 50 parts by Mass relative to 100 parts by mass of the copper powder,
    the lead-free glass fit containing a borosilicate zinc-based glass frit and a vanadium zinc-based glass fit,
    the borosilicate zinc-based glass frit containing boron oxide, silicon oxide, zinc oxide, and optional other components, among which boron oxide, silicon oxide, and zinc oxide serve as top-three oxide components in terms of content,
    the vanadium zinc-based glass fit containing vanadium oxide, zinc oxide, and optional other components, among which vanadium oxide and zinc oxide serve as top-two oxide components in terms of content, and
    the carboxylic acid-based additive being contained in an amount of at least 0.1 part by mass and up to 5.0 parts by mass relative to 100 parts by mass of the copper powder.

2. The conductive composition according to claim 1, wherein the vanadium zinc-based glass frit is contained in an amount of at least 10% by mass and pp to 90% by mass relative to 100% by mass of the lead-free glass fit.

3. The conductive composition according to claim 1, wherein the vanadium zinc-based glass frit contains vanadium oxide in an amount of at least 30% by mass and up to 50% by mass and contains zinc oxide in an amount of at least 30% by mass and up to 50% by mass.

4. The conductive composition according to claim 1, wherein the borosilicate zinc-based glass frit is contained in an amount of at least 10% by mass and up to 90% by mass relative to 100% by mass of the lead-free glass fit.

5. The conductive composition according to claim 1, wherein the borosilicate zinc based glass flit contains silicon oxide in an amount of at least 35% by mass and up to 55% by mass and contains boron oxide in an amount of at least 5% by mass and up to 20% by mass.

6. The conductive composition according to claim 1, wherein the cuprous oxide is contained in an amount of at least 5.5 parts by mass and up to 50 parts by mass relative to 100 parts by mass of the copper powder.

7. The conductive composition according to claim 1, wherein the carboxylic acid-based additive is at least one selected from oleic acid and linoleic acid.

8. The conductive composition according to claim 1, wherein the copper powder contains at least either spherical powder or flake-shaped powder.

9. The conductive composition according to claim 1, wherein the copper powder has an average particle diameter of at least 0.2 μm and up to 5 μm.

10. The conductive composition according to claim 1, wherein the conductive composition contains an, organic vehicle in an amount of at least 10% by mass and up to 50% by mass relative to 100% by mass of the conductive composition.

11. A method for producing a terminal electrode, the method comprising firing the conductive composition according to claim 1 by heat treatment at 750° C. or less.

12. The method for producing a terminal electrode according to claim 11, comprising forming nickel plating or tin plating on a surface of a conductor obtained by firing the conductive composition.

* * * * *